United States Patent [19]
McFarlen

[11] Patent Number: 5,796,811
[45] Date of Patent: Aug. 18, 1998

[54] THREE WAY CALL DETECTION

[75] Inventor: John D. McFarlen, Arlington, Tex.

[73] Assignee: Gateway Technologies, Inc., Carrollton, Tex.

[21] Appl. No.: 613,025

[22] Filed: Mar. 11, 1996

Related U.S. Application Data

[63] Continuation-in-part of Ser. No. 558,155, Nov. 15, 1995.

[51] Int. Cl.$^6$ .................................................. H04N 3/22
[52] U.S. Cl. .......................... 379/189; 379/377; 379/196
[58] Field of Search .............................. 379/377, 1, 2, 379/188, 189, 199, 339, 341, 343, 350, 351, 382, 386; 375/517, 340

[56] References Cited

U.S. PATENT DOCUMENTS

| | | | |
|---|---|---|---|
| 3,096,404 | 7/1963 | Semon | 179/42 |
| 3,113,185 | 12/1963 | Semon | 179/42 |
| 3,350,515 | 10/1967 | Semon | 179/175.1 |
| 3,397,288 | 8/1968 | Semon | 179/42 |
| 3,676,605 | 7/1972 | Johnson | 179/18 BE |
| 3,798,382 | 3/1974 | Hoven | 179/81 R |
| 3,864,519 | 2/1975 | Owen | 179/1 VC |
| 3,952,160 | 4/1976 | Pasternack et al. | 179/7.1 R |
| 3,985,956 | 10/1976 | Monti et al. | 179/1.5 A |
| 3,997,731 | 12/1976 | Wilmot et al. | 179/18 B |
| 4,054,756 | 10/1977 | Comella et al. | 179/18 B |
| 4,055,730 | 10/1977 | Stapleford et al. | 179/84 VF |
| 4,156,799 | 5/1979 | Cave | 179/18 B |
| 4,196,317 | 4/1980 | Bartelink | 179/37 |
| 4,319,091 | 3/1982 | Meri | 179/16 EA |
| 4,333,056 | 6/1982 | Cave | 330/129 |
| 4,405,833 | 9/1983 | Cave et al. | 179/1 MN |
| 4,445,211 | 4/1984 | Webber | 370/62 |
| 4,629,829 | 12/1986 | Puhl et al. | 379/58 |
| 4,686,699 | 8/1987 | Wilkie | 379/93 |
| 4,726,057 | 2/1988 | Doerry et al. | 379/145 |
| 4,737,982 | 4/1988 | Boratgis et al. | 379/202 |
| 4,768,227 | 8/1988 | Dively et al. | 379/112 |
| 4,850,011 | 7/1989 | Delmege et al. | 379/157 |
| 4,868,873 | 9/1989 | Kamil | 379/386 |
| 4,916,733 | 4/1990 | Smith et al. | 379/132 |
| 4,924,501 | 5/1990 | Cheeseman et al. | 379/201 |
| 4,932,062 | 6/1990 | Hamilton | 381/43 |
| 4,935,956 | 6/1990 | Hellwarth et al. | 379/112 |
| 4,937,856 | 6/1990 | Natarajan | 379/158 |
| 4,944,001 | 7/1990 | Kizuik et al. | 379/386 |
| 4,947,422 | 8/1990 | Smith et al. | 379/200 |

(List continued on next page.)

OTHER PUBLICATIONS

Manual for "DPD/120-JP Dial Pulse Detection Board", Dialogic Systems Ltd., Tokyo, Japan. (Product described in U.S. Patent No 5,218,636.).

DPD/120-JP product on display at Communications Tokyo '91, Apr. 2-5, 1991. (Product described in U.S. Patent No. 5,218,636.).

*Primary Examiner*—Daniel S. Hunter
*Attorney, Agent, or Firm*—Fenwick & West LLP

[57] ABSTRACT

A system and method for analyzing audio signals sampled from a telephone line during moving sample windows in order to detect indicia of three way calling attempts. The system and method sample audio signals on the telephone line, sort the sampled signals into a profile of levels for the sampled audio signals, and monitor the profile of sampled audio signals for reset and reference conditions. Reset conditions are pulse patterns identified from sampled audio signals that are inconsistent with patterns generated by three way call events. Reference conditions are pulse patterns identified from sampled audio signals that are consistent with patterns generated by three way call events. A sampling window and its associated profile are reset when reset conditions are detected. The profile is tagged as a potential three way call event when reference conditions are detected in a sample profile and no reset conditions are detected over the selected sampling interval (sampling window). In the preferred embodiment, an indication that a three way call attempt is occurring is generated when two consecutive tagged profiles are detected.

16 Claims, 7 Drawing Sheets

U.S. PATENT DOCUMENTS

| | | | |
|---|---|---|---|
| 4,979,214 | 12/1990 | Hamilton | 381/46 |
| 5,134,651 | 7/1992 | Ortiz et al. | 379/112 |
| 5,181,237 | 1/1993 | Dowden et al. | 379/88 |
| 5,218,636 | 6/1993 | Hamilton | 379/386 |
| 5,319,702 | 6/1994 | Kitchin et al. | 379/189 |
| 5,321,754 | 6/1994 | Fisher et al. | 380/48 |
| 5,428,662 | 6/1995 | Hamilton | 379/24 |
| 5,450,485 | 9/1995 | Hamilton | 379/377 |

THREE WAY CALL DETECTION

RELATED PATENT APPLICATIONS

This patent application is a continuation-in-part of co-pending U.S. patent application Ser. No. 08/558,155, filed on Nov. 15, 1995.

BACKGROUND OF THE INVENTION

1. Technical Field

This invention relates to the field of telecommunications and in particular to the field of systems and methods for detecting three way calling.

2. Background Art

The proliferation of private telephone systems and the increasingly sophisticated services offered by such systems have created a need to monitor various events occurring on the telephone lines of the system. This is particularly true with telephone systems designed to provide users with only limited access to the public switched telephone network (PSTN). For example, prison telephone systems are tightly controlled to prevent inmates from contacting unauthorized parties or using the telephone system for fraudulent purposes. These telephone systems typically include some type of authorization mechanism to prevent inmates from dialing unauthorized numbers directly. However, once connected to an authorized number, the inmate may be connected to third party at an unauthorized number using three way calling. These calls can only be prevented if the three-way calling event is detected and intercepted.

In the situation described above, the three way call is initiated when the non-local or remote party (the party outside the private telephone system) depresses the hook switch on the telephone, generating a hook flash signal. This signals the telephone central office to put the local party (the party within the private telephone system) on hold and provide a dial tone to the non-local party. On receipt of the dial tone, the non-local party dials the number of a third party, and when the connection is completed, the local party and the third party can communicate through the connection made between the non-local party and the third party.

Conventional three way call detection systems typically monitor the local telephone connection for the hook flash or associated central office signals that fall in a frequency band outside the range of signal frequencies produced by the human voice. These systems monitor signals on the local telephone line through a frequency filter designed to pass audio signals in this frequency band. A three way call attempt is indicated whenever signals in the frequency band have energies above a selected threshold.

Conventional frequency filtering methods for detecting three way call attempts are not very accurate for a number of reasons. The underlying assumptions about the frequency profile of three way call events, i.e. the hook flash and signals generated by activating central office switches, are often wrong. For example, the hook flash signals are often modified by transmission through switches and along loaded lines, and even if assumptions about the frequency characteristics of the initial signal are accurate, these characteristics are substantially distorted by the time the "hook flash" signal reaches the three way call detection system.

Thus, there is a need to provide a reliable system and method for detecting three way call attempts, particularly where these attempts are being used to circumvent restrictions placed on private telephone systems.

SUMMARY OF THE INVENTION

The present invention is a system and method for detecting three way calls by monitoring audio signals for features that distinguish voice and line-generated audio signals from audio signals produced by events associated with three way call attempts. The distinguishing features used are typically characteristic pulse patterns that are strongly correlated with either audio signals generated by central office switching activity ('clicks') or voice-generated audio signals. The former features, termed reference features, identify audio signal segments as potential three way click events. The latter features, termed reset features, disqualify signal segments as potential click events and restart monitoring.

In accordance with the present invention, audio signals are continuously monitored for reference and reset features over selected intervals or sampling windows. Sampling windows are reset whenever reset features, i.e. pulse patterns characteristic of voice generated audio signals, are detected in the associated audio signal segment. On the other hand, audio signals that are free of reset features and include reference features are tagged as potential click events. A three way call event is declared when audio signals associated with consecutive sample windows are tagged as potential three way call events.

The system and method of the present invention sample audio signals at a selected rate and sort them according to various loudness and timing criteria. The sorting process provides a moving profile of the sampled audio signal from which features such as characteristic pulse patterns can be isolated and analyzed. As signals are sampled within the window, the accumulated profile is analyzed for reset features and reference features. A sample window is tagged as a potential three way call event if the profile accumulated during the sample window includes certain reference features and is free of any reset features. Detection of reset features automatically restarts the sampling window, minimizing the chances that three way call events are missed. One embodiment of the present invention declares a three way call attempt when profiles in consecutive sample windows are tagged.

In accordance with the present invention, audio signals from remote and local telephones are separated by dual hybrid circuits and processed through codecs and a digital signal processor (DSP) to further separate the remote and local audio signals. A control program implemented by the digital signal processor samples the audio signal at the selected rate and sorts the sampled signals during a sampling window to produce a profile of the sampled audio signal. The profile comprises counters for tracking the number, strength (loudness), and separation of signal pulses. These counters may be compared in various combinations with counter values extracted from voice-generated audio signals (reset thresholds) and three-way call generated audio signals (reference thresholds) to declare a three way call attempt, continue sampling, or reset the sampling window. In addition, a separate program module independently monitors remote and local signal lines, corrects the monitored signals to compensate for cross-over between lines, and determines accurately the line on which sampled signals originated. Signals originating on the remote telephone line, having profile features consistent with those produced by actual three way call events (clicks) and inconsistent with those of voice-generated audio signals over the sampling window are tagged as potential three way call events. A three way call attempt is declared when profiles in consecutive sampling windows are tagged as potential three way call events.

3

Figure 2A:
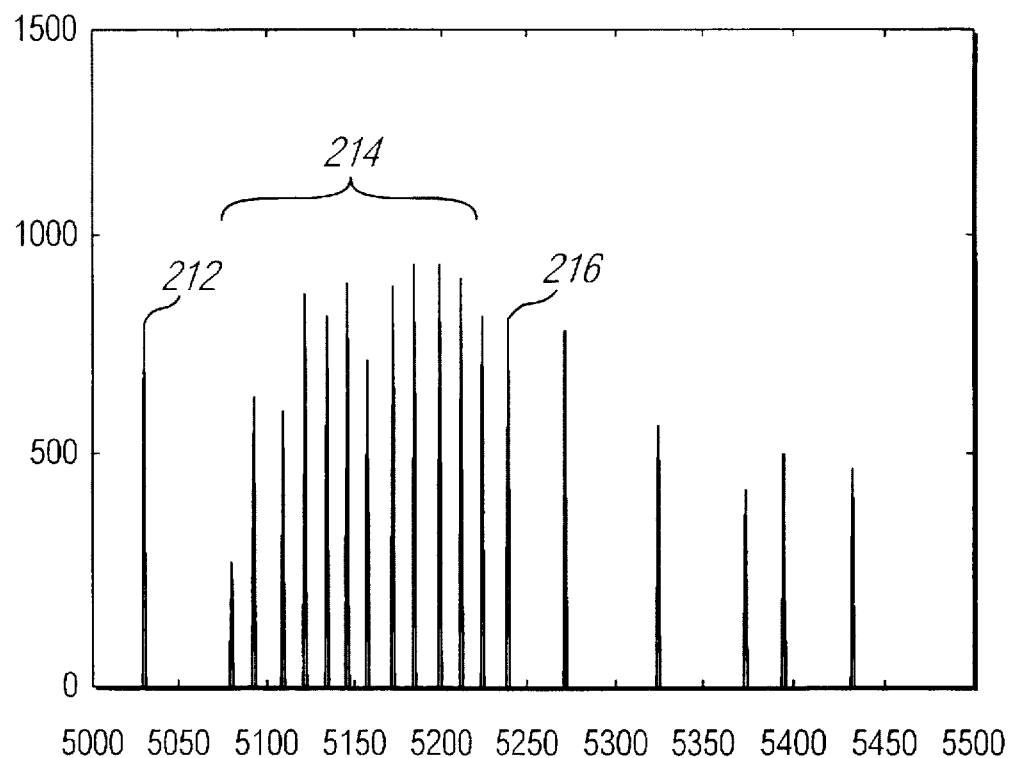

FIG. 2A is a profile of the positive-going pulses of a sampled audio signal produced by abrupt vocal sounds intended to mimic the bridging signals generated by three way call clicks.

Figure 2B:
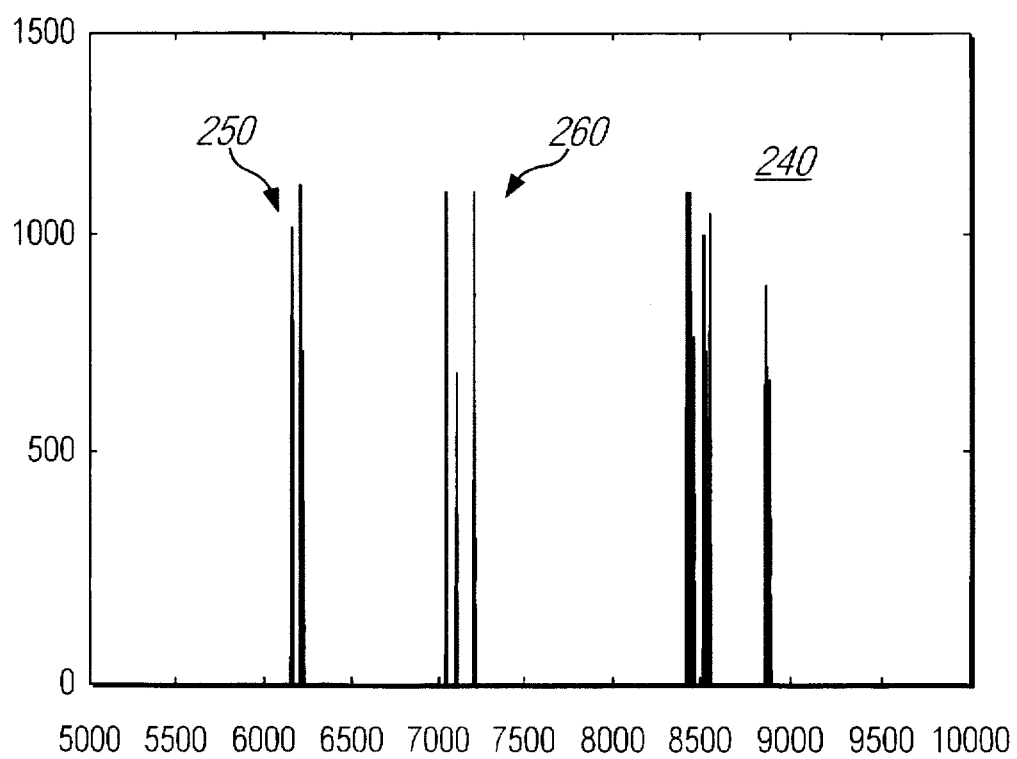

FIG. 2B is a profile of the positive-going pulses of a sampled audio signal produced by actual three way call bridging activity.

Figure 2C:
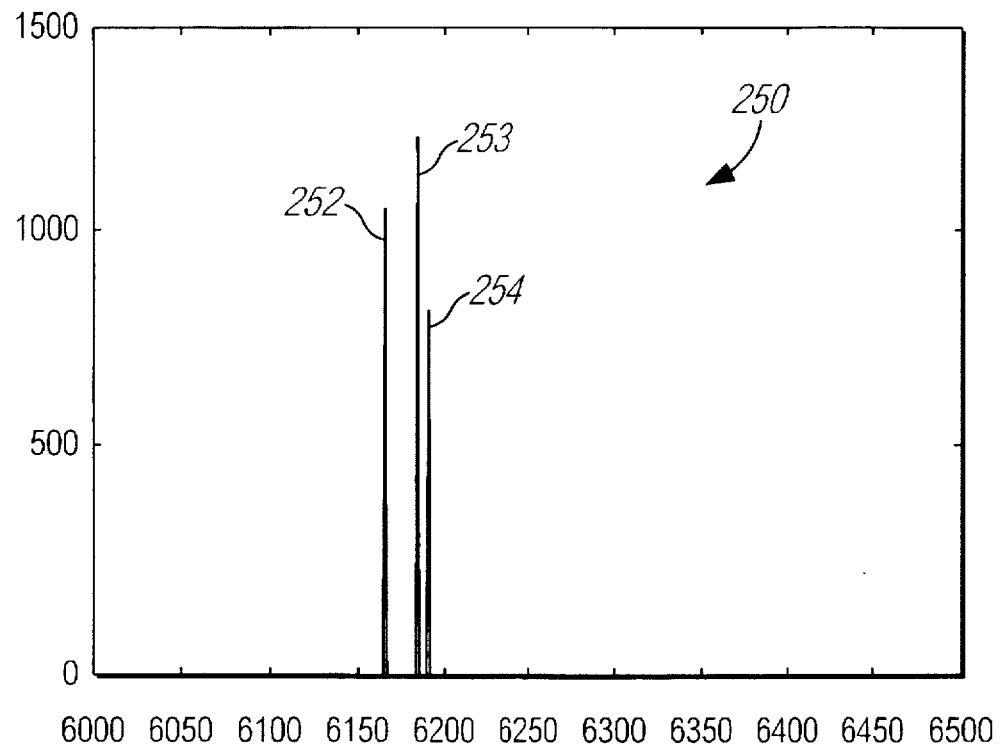

FIG. 2C is an expanded view of one section of the profile of FIG. 2B.

Figure 2D:
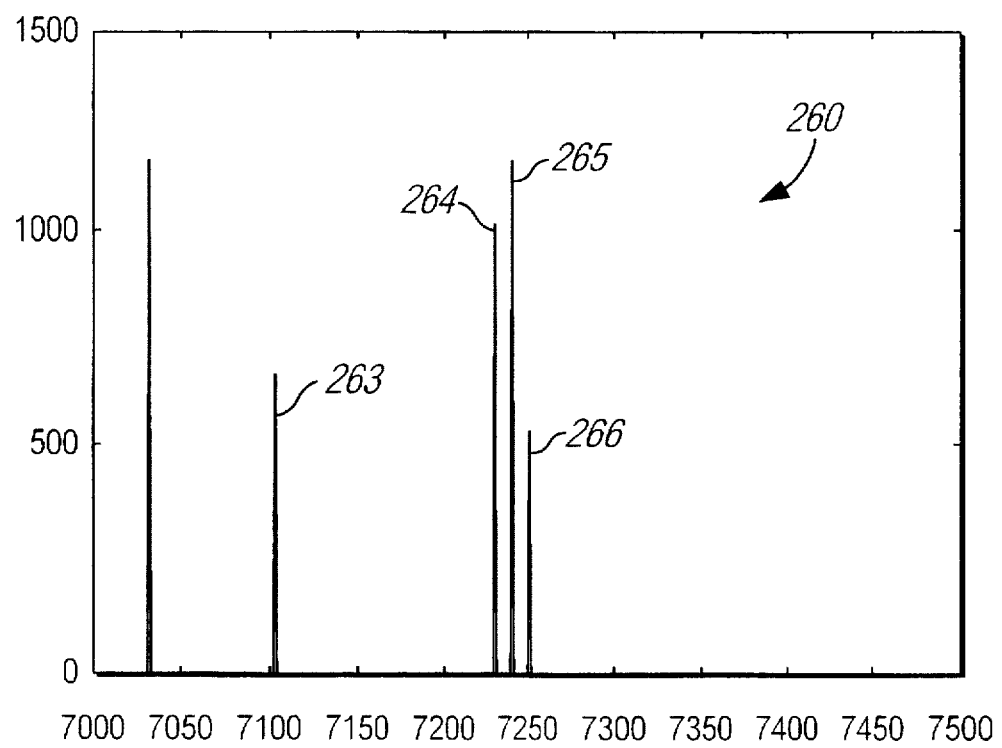

FIG. 2D is an expanded view of another section of the profile of FIG. 2B.

Figure 3:
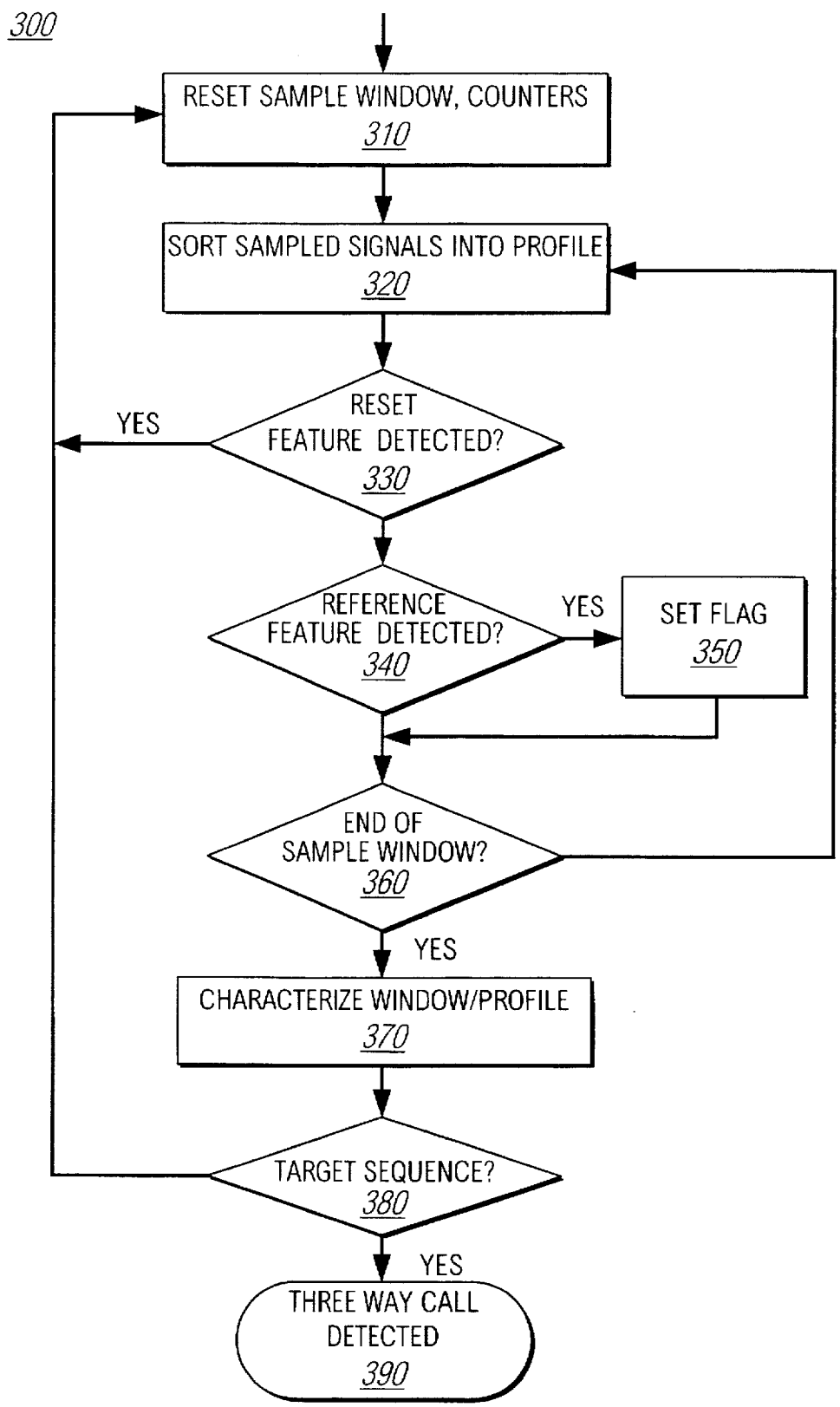

FIG. 3 is an overview of a method for detecting three way calling in accordance with the present invention.

Figure 4:
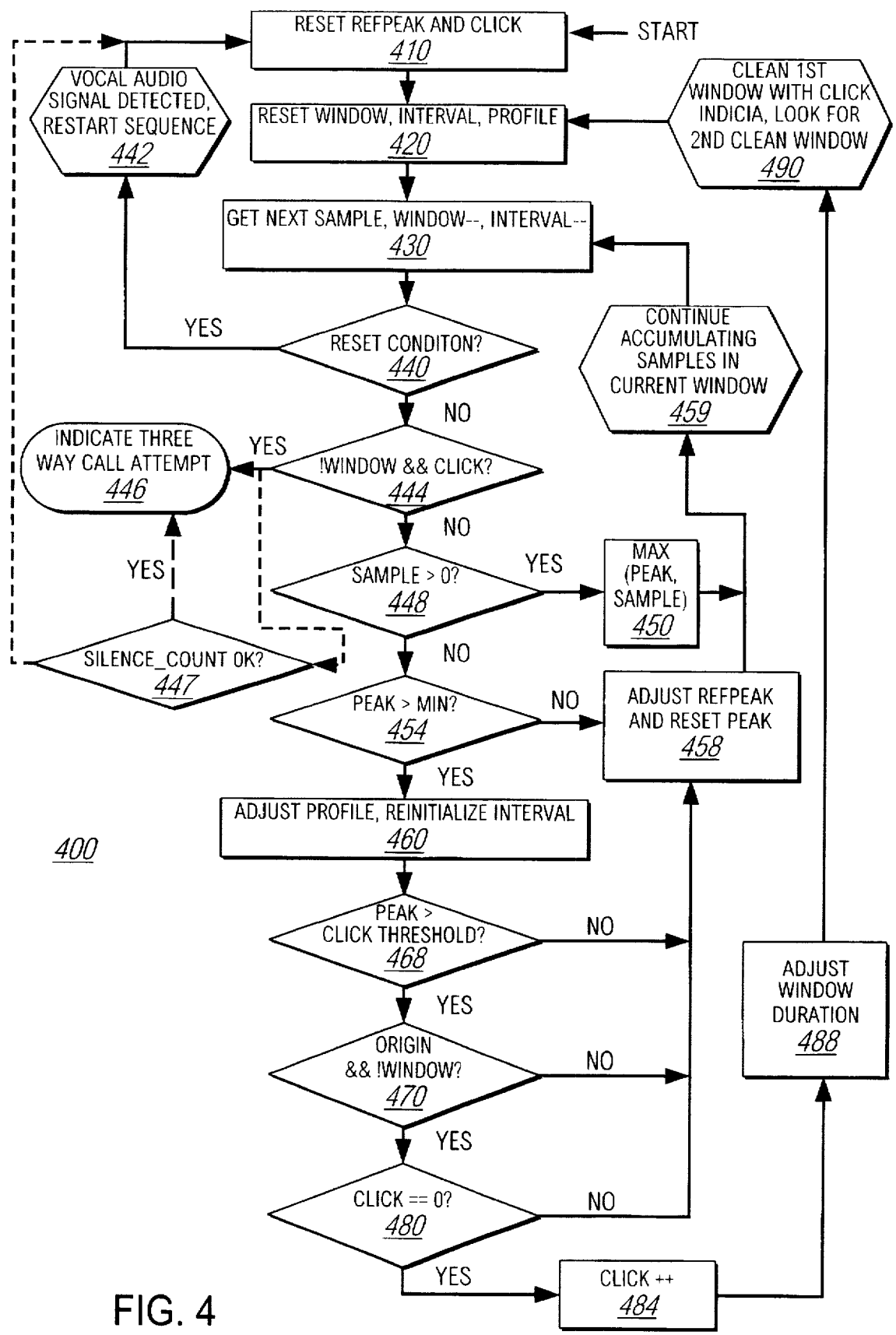

FIG. 4 is a flow chart detailing the sampling and comparison modules of a preferred method for detecting three way calling in accordance with the present invention.

Figure 5:
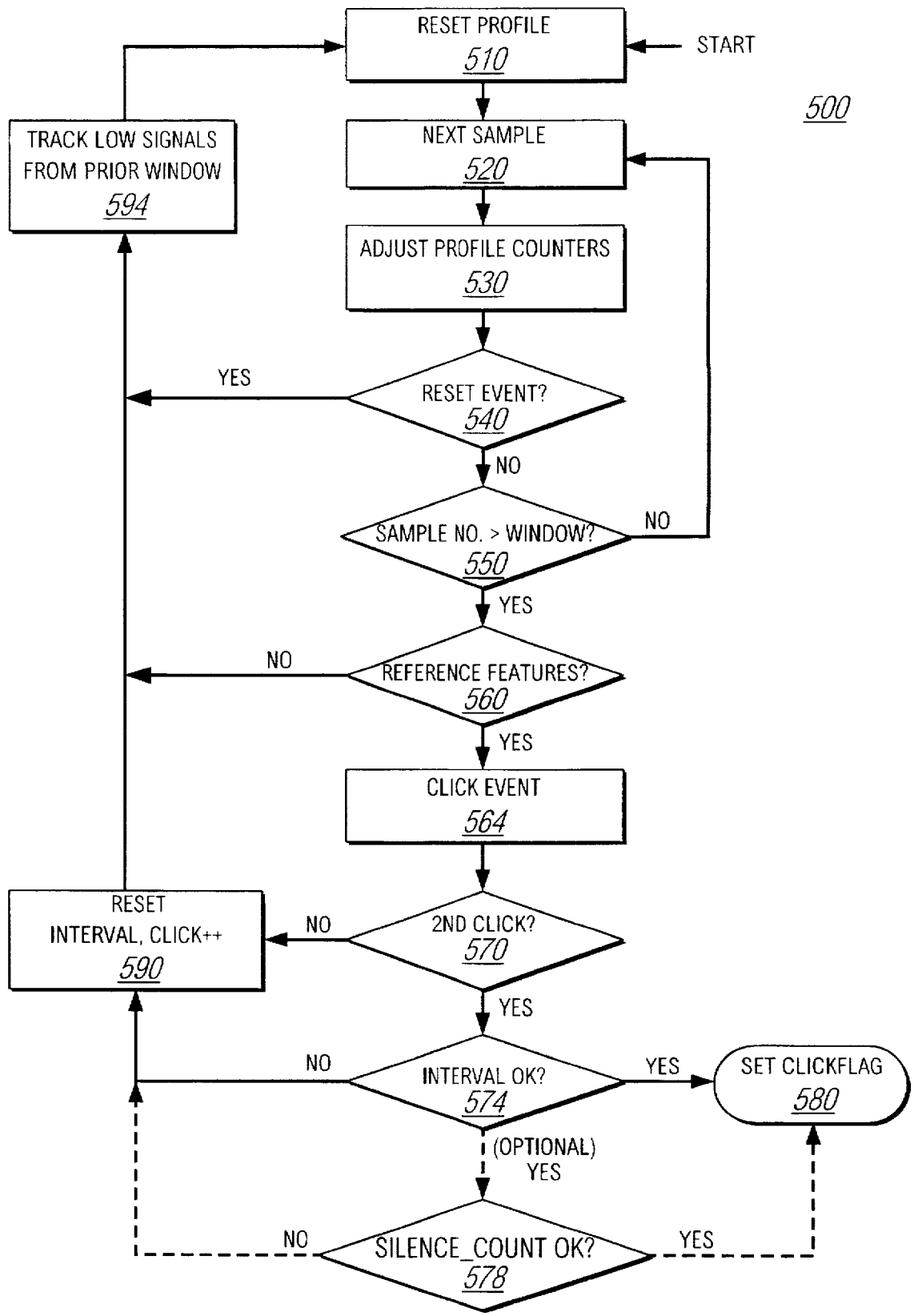

FIG. 5 is a flow chart detailing the sampling and comparison module of another method for detecting three way calling in accordance with the present invention.

Figure 6:
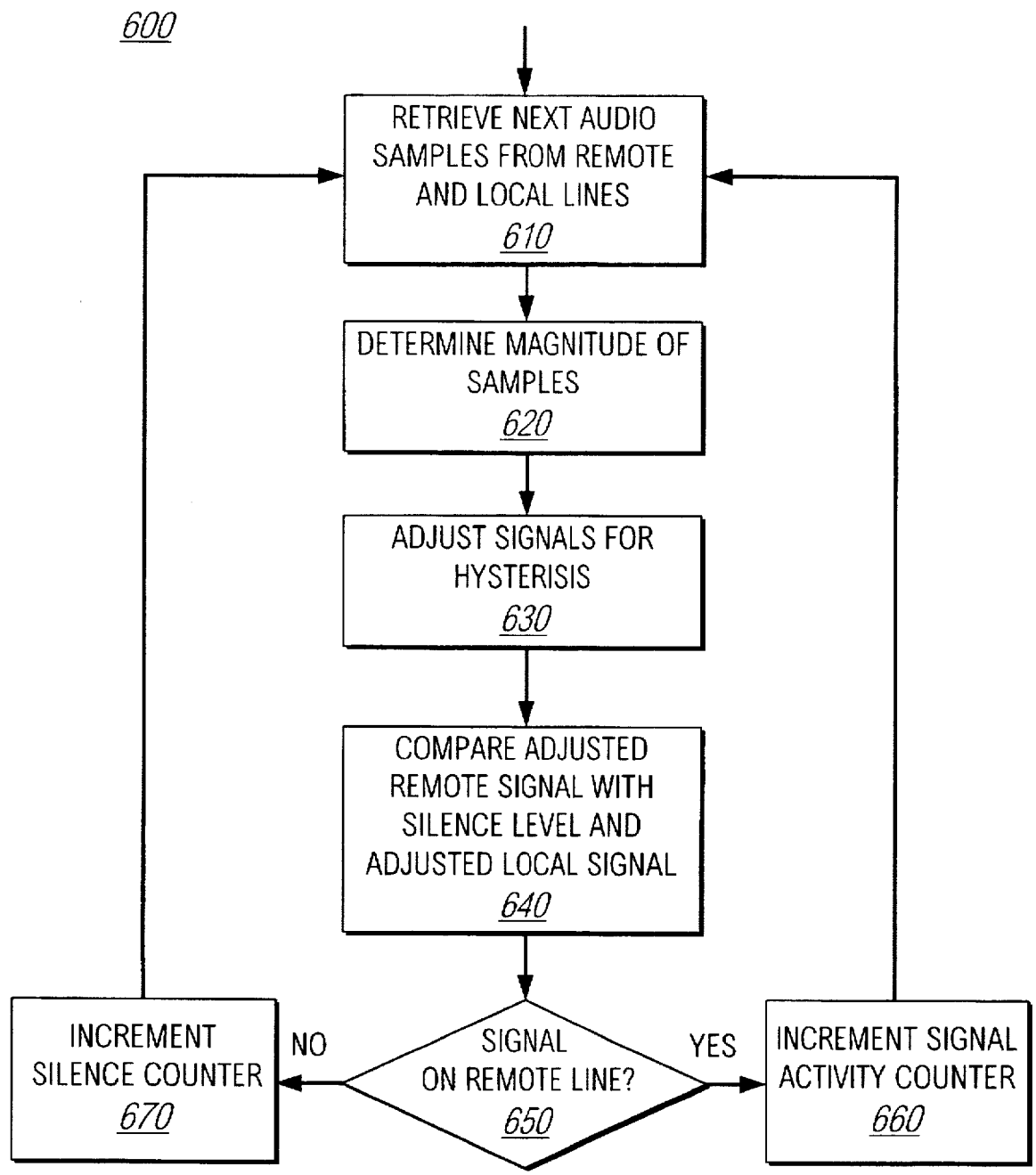

FIG. 6 is a detailed flow chart of a signal origin detection module suitable for use with the methods of FIGS. 4 and 5.

DETAILED DESCRIPTION OF THE INVENTION

Figure 1:
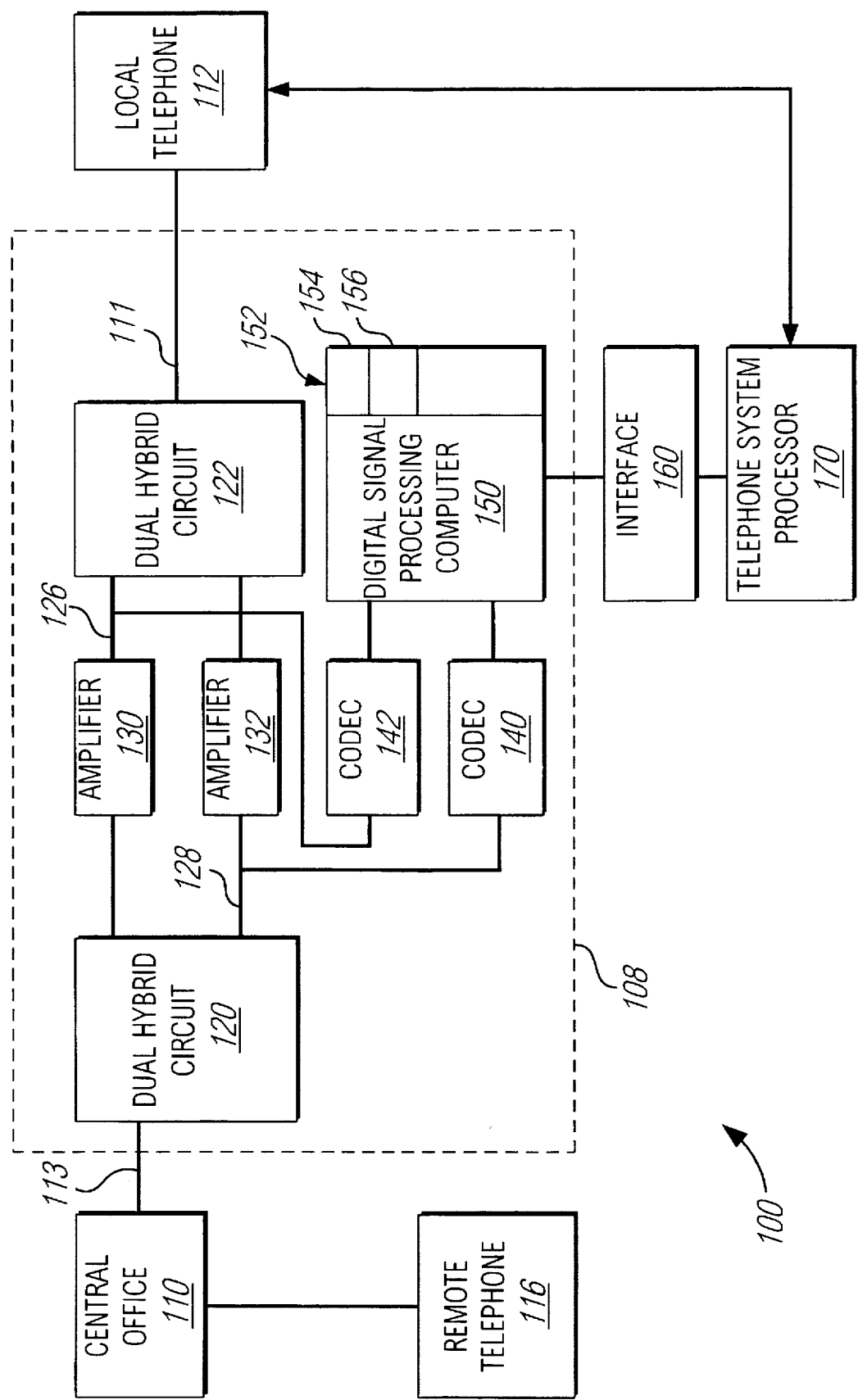
FIG. 1 is a block diagram of a telephone system including three way call detection system of the present invention.

Referring to FIG. 1, there is shown a telephone system 100 including a three way call detection system 108 in accordance with the present invention. Telephone system 100 comprises a remote telephone 116, a central office 110, and a local telephone 112 connected to remote telephone 116 through three way call detection system 108 and central office 110. In the disclosed embodiment of the invention, local telephone 112 is part of a private telephone system that also includes three way call detection system 108. Calls placed from local telephone 112 are connected to non-local telephone 116 through switches (not shown) controlled by central office 110. Local telephone 112 and central office 110 are shown connected to three way call detection system 108 by two-wire lines 111, 113, respectively, although other media may be used to couple signals among elements of telephone system 100.

Three way call detection system 108 comprises dual hybrid circuits 120, 122 for transferring audio signals between two-wire lines 111, 113 and separate local 126 and remote 128 signal lines. Coder/decoder (codec) 140 digitizes an audio signal on remote line 128 and couples it to digital signal processor (DSP) 150. Similarly, codec 142 digitizes an audio signal from local signal line 126 and couples it to DSP 150. Amplifiers 130, 132 are included on local and remote signal lines 126, 128 to compensate for any reduction in signal strength by hybrids 120, 122, respectively. Codecs 140, 142 suitable for the present invention are commercially available units such as Texas Instruments' TCM29C16 codecs.

DSP 150 is a processor chip that implements an instruction set suitable for processing digital signals. Digital signal processor 150 may be, for example, a commercially available unit such as Texas Instruments' TMS320C31 DSP. DSP 150 implements programs 154, 156, which are stored in a memory 152 associated with DSP 150 and used for processing digitized signals received from codecs 140, 142. For example, program 154 may be an echo canceller, which reduces traces of the local signal in the remote signal and reduces traces of the remote signal in the local signal to further improve the separation between the local and remote signals. In the disclosed embodiment, program 156 is a

4 computer implementation of the method of the present invention for analyzing audio signals for indicia of three way calling events.

Also shown in FIG. 1 is an interface 160 and a telephone system processor 170 which receives data from DSP 150 through interface 160. Telephone system processor 170 controls local telephone 112 and uses information provided by three way call detection system 108 to regulate access to the public switched telephone network, i.e. central office 110, from local telephone 112. Telephone system processors 170 are also available commercially as components of private telephone systems. For example, the Gateway CPS 4000 system available from Gateway Technologies is described in related U.S. patent application Ser. No. 08/109,130, which is hereby incorporated by reference. The Gateway system is a private telephone system available for use in prisons and other environments in which calls must be monitored and controlled.

Detecting three way call attempts requires that clicks generated by central office bridging activity associated with three way calls be identified from among the voice signals and noise that form the audio signal on telephone lines. In addition, the audio signals must be segregated in order to determine whether the source of a particular signal is local telephone 112 or remote telephone 116 by way of central office 110. Dual hybrid circuits 120, 122 provide the initial separation of local and remote audio signals, which is approximately 30 dB in the disclosed embodiment. This separation is further enhanced by digitizing the remote and local audio signals using codecs 140, 142 and processing the digitized signals with echo canceller program 154 implemented by DSP 150. Codecs 140, 142 output audio signal data to DSP 150 in a μLaw (logarithmic) Compression format. In the preferred embodiment of the invention, DSP 150 scales the codec data to signal levels ranging between −8000 and +8000.

In a preferred embodiment of the present invention, program 156 includes a module for further refining the measurement of signal origins. This signal origin module, which is described in greater detail in conjunction with FIG. 6, monitors sampled signals from both local and remote lines 126, 128, respectively, and adjusts audio signal levels on remote line 128 to reflect coupling of audio signals from local line 126 (sidetone). This allows the origin and nature of sampled audio signals to be determined with increased accuracy.

Indicia of three way call attempts include various switch closing events and pauses associated with different steps of the three way calling process. These events produce the reference features/conditions for which sample profiles may be monitored. Among these events are the hook flash and the consequent switching activity in central office 110. Multiple clicks produced by the central office switching activity generate audio signals (click-generated audio signals) on remote line 128 which are detected using the present invention.

Previous methods for detecting three way calling have attempted to isolate and detect low frequency components of signals generated by the hook flash or central office clicks. Unfortunately, mixing of human voice signals can produce low frequency components in the same frequency range in which these three way call events are nominally isolated. Further, differences in the telephone equipment can produce different frequency profiles for the signals generated by the hook flash and switch closing events.

The present invention analyzes sampled audio signals for reset or reference features as profiles of the sampled signals are accumulated during a sampling window. Reset features are features of sampled profiles that are associated with voice-generated audio signals, such as pulse patterns including roughly comparable numbers of loud and low level signals within a specific interval. Reference features include pulse patterns characteristic of three way call events. For example, one reference feature may be a pulse pattern in which a relatively loud pulse originating on remote telephone line 128 is accompanied by few if any low level signals within a specified interval. Clearly, the same pulse patterns can be cast as reset features or reference features depending on how the sample testing is arranged. For example, a profile can be tested for the absence of low level signals near a loud signal, in which case it is a reference feature, i.e. present in audio signals generated by 3 way call clicks. Alternatively, a profile can be tested for the presence of certain numbers of low level signals within a specified interval of a loud signal, in which case the pattern is cast as a reset feature.

Independently of how the signal analysis is arranged, these reference and reset features have been found to persist across different telephone lines and switching equipment and can be isolated by sampling audio signal wave forms for selected intervals (sampling windows) at selected sampling frequencies. The detection and analysis of pulse patterns to discern reference and reset features forms the basis of the present invention.

It is noted that reference features may be present in voice/line generated audio signals. Consequently, the presence of reference features in an audio signal is usually not a reliable test for three way call events. This is one reason why conventional three way call detection schemes that simply look for audio signals having frequency characteristics or energy (loudness) levels ascribed to three way call events have proven to be unreliable. While such characteristics may be necessary features of three way call generated audio signals, they are not sufficient to distinguish these signals from voice or line generated signals. The system and method of the present invention look for audio signals that include selected reference features while being free of reset features characteristic of voice-generated audio signals. The sampling strategy employed by the system of the present invention tests audio signals for a variety of reference and reset features that are independent of the audio signal frequencies. This provides a three way call detection system and method that are robust despite differences in telephone lines and components.

Typical audio signal wave forms comprise amplitude excursions above and below a reference level corresponding to zero signal. Sampling the audio signal waveform picks out amplitudes of the audio signal waveform at fixed intervals equal to the sampling period, i.e. (sampling rate)$^{-1}$. Profiles generated from sampled audio signals during sampling windows of appropriate duration include information about the pulse structure of the underlying audio signal wave forms. The duration of the sampling window, which ranges from about 10 ms to about 150 ms, is determined by the minimum time interval over which pulse patterns characteristic of reference and reset features are manifested. Samples may be collected over longer intervals, but if the sample window is set too long, the likelihood of disqualifying a real three way call attempt by a nearby reset feature increases.

By sorting sampled signals into a profile during each sampling window and monitoring the profile as samples are accumulated, new sampling windows can be initiated whenever reset features are detected. This approach minimizes the likelihood that a 'click' event will be missed while completing a sampling window for a profile that has already been disqualified as a potential 'click' event based on the sampled signals accumulated. Sampling windows are completed only if no reset features are detected over the prescribed interval. These windows and their associated profiles are clean or free of pulse patterns characteristic of voice-generated audio signals (reset features). Clean profiles that also include reference features are tagged as potential three way call events. This may be done, for example, by associating a 'click' flag with the profile or window, which are hereafter identified as tagged profiles/windows.

Three way call detection in accordance with the present invention may require detection of various combinations of clean or tagged windows before declaring that a three way call attempt has occurred. In addition, the duration of sampling windows may be adjusted depending on the analysis of the audio signals in the preceding sampling window and whether or not this window was completed. In a preferred embodiment of the invention, a three way call attempt is declared only when a reference feature is preceded by a profile that is free of reset events for a first interval, i.e. the sample window, and followed by a profile/window including a reference event and free of reset events for a second interval. In effect, a pair of adjacent tagged windows (profiles) are detected before declaring a three way call attempt. The first tagged window provides a buffer between any non-click type audio signals, i.e. voice-generated audio signals or line noise, and the click event, and the second window ensures that the relative number of nearby low and high level signals that is characteristic of click events persists for a period consistent with that seen in actual three way call attempts.

In the preferred embodiment of the present invention, audio signals are monitored for multiple tagged windows since central office switching activity consistently generates multiple clicks. Requiring multiple tagged windows thus reduces the incidence of false positive detection of three way call attempts without making the detection criteria so restrictive that actual three way call attempts are missed.

Consistent with the present invention, audio signal wave forms may be sampled in a number of ways that facilitate detection of the pulse patterns characteristic of three way call clicks and voice-generated audio signals, i.e. reference and reset features, respectively. For example, the absolute value of a sampled signal relative to a zero reference level may be tracked to form a distribution or profile of the sampled signals. Alternatively, the signal profile may be generated from only those audio signal samples that exceed the zero reference level, i.e. positive-going pulses. In either case, as long as the reference and reset features are determined from comparable sampling schemes, the method reliably detects three way call attempts.

Referring now to FIG. 2A there is shown a profile 210 of sampled audio signals that exceed a zero reference level. Profile 210 was generated by an abrupt vocal sound intended to mimic the clicking noises produced by bridging activity associated with three way call connections. The vertical axis represents the positive output of DSP 150, which provides a measure of the loudness of the sampled signals in the scaled units ranging in magnitude from 0 to 8000 with increasing signal loudness. While these units are convenient for implementing the methods described below, any other measure of signal loudness may be substituted, provided thresholds are adjusted accordingly.

The horizontal axis of FIG. 2A represents the total number of signals sampled. For a fixed sampling rate, this number is equivalent to the time at which the samples having the indicated DSP outputs are detected. For example, in the disclosed embodiment, audio signals are sampled at a constant rate of approximately 8 KHz. At this rate, signal peak 216 centered at about 5240 occurs approximately 25 ms after signal peak 212 centered at 5040, and twelve peaks 214 of comparable loudness occur in the 25 ms interval between signal peaks 212–216.

Referring now to FIG. 2B, there is shown a profile 240 of sampled signals generated by bridging activity at central office 110 during an actual three way call connection initiated at remote telephone 116. Note that the sample number axis (x-axis) employs a different scale than that used in FIG. 2A. Expanded profiles of sample subsets 250, 260 of profile 240 having x-axes scaled comparably to the x-axis in FIG. 2A are shown in FIGS. 2C and 2D. Samples producing DSP outputs at levels below 250 are not recorded. As can be seen from FIG. 2C, profile 250 comprises a series of relatively few, loud (DSP output>800) peaks 252–256 in an approximately 25 ms window (200 samples). For example, four peaks 263–266 in FIG. 2D occur in the 200 sample window between 7050 and 7250, and these peaks have amplitudes of between approximately 600 and 1200 units. As can be seen, there are substantial periods in which no signals or signals having DSP outputs of <250 appear between peaks 261 and 266. A similar pattern is apparent in profile 250 of FIG. 2C. Both patterns are in marked contrast to the twelve or more peaks 214 in profile 210, approximately one third of which are at level 600 or lower.

The different pulse patterns profiles 250, 260 and profile 210 provide a way to distinguish audio signals generated by three way call attempts from voice-generated audio signals or line noise. The method of the present invention uses these distinctive pulse patterns to exclude some sampled profiles from consideration as three way call attempts and to tag as potential three way call events other sample profiles accumulated during sampling windows.

As noted above, profiles 240 are merely one representation of sampled signals generated by bridging activity (clicks) associated with three way call attempts. A person skilled in the art will recognize that other methods for sampling audio signals to generate profiles that can be monitored for reset and reference events, and these methods are considered to be within the scope of the present invention. For example, different sampling rates and different loudness level profiles may be used to characterize the pulse patterns of sampled audio signals. In general, any of a variety of methods for statistically analyzing sampled signals may be used to characterize and compare sampled signal features with reference and reset features to detect three way call events.

Referring now to FIG. 3, there is shown an overview of a method 300 in accordance with the present invention for detecting three way calls. To start, a profile is initiated 310 by resetting counters that track the number and level of sampled signals. Other counters such as those for tracking the time since the last non-zero pulse may also be reset at this time. The duration of the sampling window is specified by a minimum number of samples necessary for a reliable profile. Typically, a reliable profile includes sufficient sampled signals to encompass a potential 3 way call click event and adjacent signals within an interval of approximately 20–30 ms.

During each sampling window, sampled audio signals are sorted 320 according to their energy or loudness levels and corresponding counters are incremented to generate the sample profile. The profile counters are tested 330 and if a reset feature is detected 330 as, for example, when a counter representing the number of low level pulses exceeds a threshold level, the profile counters are reset and a new sampling window initiated. On the other hand, when a reference feature, such as a signal pulse above a level characteristic of a three way call 'click', is detected 340, the profile (or its associated sample window) is tentatively tagged 350 as a 'click'. Sampling continues 360 until a reset event is detected 330 or the end of the sampling window is reached 360.

If the end of the sample window is reached 360 without detecting any reset events, the sampled profile/window is characterized 370. For example, a flag such as the flag set at step 350 may be checked to determine whether the profile included a pulse large enough to qualify as a 'click'. If so, the profile is tagged, indicating that a three way call attempt may be occurring. Three way call attempts are confirmed when selected sequences of tagged profiles are detected 380 in an audio signal. In the preferred embodiment of the invention, the selected sequence of tagged profiles occurs when one tagged profile is followed immediately by a second tagged profile. Consequently, if the current tagged profile is determined 380 to be the first of a target sequence, profile and timing counters are reset 310 and audio signals are analyzed for a second tagged profile. If the current tagged profile is determined 380 to be the second of a target sequence, a three way call attempt is declared.

Another check on potential three way call events is the inclusion of a silence detection step in target sequence 380. As noted above, central office bridging activity accompanying three way call attempts are followed by a period of silence on remote line 128 as local telephone 112 is put on hold while the connection between the remote and third parties is established. Thus, it may be desirable to monitor remote line 128 for silence following detection of potential three way call click events. In this case, the selected target 380 sequence includes detection of a silence interval of appropriate duration following detection of consecutive tagged profiles.

In the disclosed embodiments of the present invention, steps 310–320 and 330–380 are carried out by sampling and sorting/comparison engines, respectively, stored as data in memory 152 and implemented by DSP 150. In addition, the signal origin engine (FIG. 6) may be accessed at various points in process 300 to confirm the origin and monitor the level of audio signal activity. In the disclosed embodiment, the signal origin engine also implements silence detection step when it is included in step 380. However, there is no reason why these functions may not be implemented by separate modules or engines.

Referring now to FIG. 4, there is shown a detailed flowchart of the preferred embodiment of a method 400 in accordance with the present invention. In general, audio signals as represented by sampled levels at the output of DSP 150 comprise a series of positive and negative pulses in which a series of contiguous sampled signal levels fall above or below, respectively, a zero reference. For example, profiles 210, 240, 250, 260 of FIGS. 2A, 2B, 2C, 2D, respectively, include only the positive-going signal pulses at the output of DSP 150. Method 400 generates a sample profile using the highest peak of each positive going pulse within a sample window. This allows accumulated profiles to be analyzed during the negative-going portion of the sampled signals.

Method 400 begins by resetting 410, 420 the counters and variables used to characterize the sample window, its associated profile, and the window sequence. REFPEAK, a variable representing the largest peak in a sample window, and CLICK, a flag used to tag clean sample windows that include click reference features, are reset 410 each time a reset feature is detected 440 in a profile. This restarts signal analysis when, for example, pulse patterns characteristic of voice-generated audio signals are detected 440, 442 in the accumulated profile.

At step 420, variables WINDOW, INTERVAL, and PROFILE specific to each sampling window are reset. WINDOW is a counter for tracking the number of samples analyzed in the current sample window, INTERVAL is a counter for tracking the number of samples between detection of positive going pulses, and PROFILE represents the counters used to track signal levels in a profile within the current sample window. In the disclosed embodiment, WINDOW is initialized at between 200 and 300 samples, each time a new sample window is begun, and decremented 430 each time a new sample is retrieved from DSP 150. Similarly, INTERVAL is initialized at between 300 and 400 for each new sample window and decremented at step 430. WINDOW is tested 444, 470 at various points during method 400 to determine whether the current sample window is complete, i.e. includes enough sampled signals to provide a reliable test for click-generated audio signals. INTERVAL provides an indication that too little signal activity has occurred to be consistent with click pulses if too many signal samples are retrieved without detecting a pulse having a level greater than a minimum value (step 460). Each time a pulse level exceeding the threshold value is detected, INTERVAL is re-initialized to the threshold value. It is tested, for example, at step 440, and causes a reset 410 of the window sequence if it reaches zero.

PROFILE comprises counters that are adjusted to reflect the level pulses in the current sampling window relative to REFPEAK, the loudest peak in the current profile. In the preferred embodiment of the invention, PROFILE comprises two counters, designated as LOUD and LOW, which represent the distribution of sampled signals relative to REFPEAK in the profile of the current sample window. Associated with each of these counters is a threshold level, indicating the maximum number of LOUD and LOW peaks typically present in the profile of a click-generated audio signal. These counters are tested 440 and cause a window sequence to reset 410 if either exceeds its corresponding threshold.

In the preferred embodiment of the present invention, a 25 ms window (reset value of WINDOW=200) is employed and the thresholds for LOUD and LOW counters are 2 and 3, respectively. That is, detection of more than 2 LOUD peaks or more than 3 LOW peaks within a 25 ms. window constitutes a reset condition and all counters are reset to their starting values. Sorting of sampled signals into LOUD and LOW peaks is discussed below.

Sorting of the peaks for all positive-going pulses of the current sample window and adjustment of PROFILE counters occurs during the negative going part of the audio signal. For example, it is determined 448 whether the sample is above or below the zero reference. When the sample is above the zero reference (positive-going pulse), the value of PEAK is adjusted if necessary, so that PEAK always equals the highest sample level in a positive-going pulse, and the next sample is retrieved 430. If the sample is below zero, the size of PEAK is compared 454 with a minimum threshold used to distinguish signal pulses from noise. In the disclosed embodiment, this level is typically set between 200 and 300. PEAK values below this threshold are considered noise and process 400 continues 430 with a new sample. PEAK values above the minimum threshold are categorized as LOUD or LOW signals, depending on their levels relative to REFPEAK, and the corresponding PROFILE counters (LOUD, LOW) are adjusted 460. In addition, INTERVAL counter is reinitialized to indicate the presence of signals above the minimum threshold.

In the preferred embodiment of the invention, PROFILE adjustment step 460 proceeds as follows. LOUD is incremented when PEAK exceeds the minimum value and (0.4) ×REFPEAK. LOW is incremented when PEAK exceeds the minimum value but is less than or equal to (0.4)×REFPEAK. On the other hand, if PEAK exceeds REFPEAK, LOW is incremented and LOUD is reset to zero, since PEAKs are only characterized as LOUD relative to the loudest PEAK value, REFPEAK. The minimum PEAK value considered in the preferred embodiment of the invention is 250. PEAK values below 250 are considered noise and are not analyzed. As discussed above, reset occurs in the preferred embodiment whenever LOUD or LOW exceed their threshold values (2 and 3, respectively).

The current value of PEAK is then tested for a reference feature, which in the disclosed embodiment is a level in excess of a minimum threshold level associated with 'click'-type peaks. The minimum click threshold is between about 700 and 1200, and in the preferred embodiment of the invention, the threshold level is set at 800. Sample profiles are only tested for completion 470 when the current PEAK meets a 'click' threshold requirement. This ensures that a profile tentatively tagged as a three way call event includes a 'click' pulse preceded by a sample window that is free of reset events. If the current value of PEAK is below the 'click' threshold, method 400 proceeds with the next sample 430.

Provided the current value of PEAK meets the 'click' threshold requirement 468, the origin (FIG. 6) and WINDOW counter (number of samples accumulated in the sample profile) are tested 470. The CLICK flag is set 490 only when a first sample window of a window sequence is completed 470 and the associated profile includes a PEAK originating on remote line 128 (step 470) that meets or exceeds 468 the click threshold. Upon detection of a first sample window meeting the above requirements, CLICK flag is set 484, tagging the associated sample window as a potential three way call event. The CLICK flag is reset 410 every time a window sequence is disqualified 440 by some reset event.

In the disclosed embodiment of the invention, a three way call event is only declared when a sequence of two consecutive tagged profiles is detected. Accordingly, following setting 484 of CLICK flag on detection of the first tagged profile, WINDOW duration is adjusted 488 if desired, INTERVAL and PROFILE counters are reset 420, and samples are accumulated 430 for a second sample window. If a second sample window is completed 470 and the associated profile satisfies the origin 470 and click threshold requirements 468 before a reset event is detected 440, the three way call conditions 444 are satisfied and a three way call attempt is declared 446. Detection of a reset event 440 in either sample window clears all counters to their initial states 410, 420 and restarts process 400.

As noted above, other sampling methods may be employed to detect click type events on remote line 128. An alternative embodiment of the present invention samples signals and sorts them according to their energy levels, without regard to the pulses they form and without identifying a largest pulse within the sample window. This method may be applied to signals of positive going pulses only or to signals of both positive and negative going pulses. In the latter case, due care must be exercised to ensure that sufficient time exists between samples to maintain the currency of accumulated sample profiles and provide adequate time for analyzing the profile.

Referring now to FIG. 5, there is shown a flowchart of an alternative embodiment of the present invention. As with method 400, method 500 continuously analyzes audio signals using a sliding sample window to insure that features occur within time intervals characteristic of three way call events. The main differences between methods 400 and 500 are the times at which PROFILES are tested for reference features and the means for ensuring that a buffer of clean, i.e. non-voice generated, audio signals occurs between voice-generated audio signals and potential click pulses. Specific threshold levels used for various counters are also different. These differences are discussed in greater detail below.

Method 500 is initiated when PROFILE counters representing the distribution of sampled signals in a sample window are reset 510 to zero. The audio signal is then sampled 520 at a selected rate and the sampled signal is characterized 520 according to pre-selected threshold levels to update 530 corresponding PROFILE counters. In this embodiment of the invention, signals are characterized as LOUD, LOW, or NO-signals according to whether the retrieved signal level exceeds a first threshold level, falls between first and second threshold levels, or falls below the second threshold level, respectively. In the preferred embodiment of method 500, all signals are characterized into one of the three signal levels based on their absolute magnitudes and corresponding LOUD, LOW, and NO level counters are incremented accordingly. With this scheme, the total number of signals in the current sample window equals the sum of PROFILE counters LOUD+LOW+NO.

For each new sample, the PROFILE counters are checked 540 for certain reset conditions and if any are detected, a new sample window is initiated 510 after resetting 594 a counter LOWH to track low level signals from the preceding window. As discussed below, updating LOWM in this manner insures that any click type signals detected in the current sample window are not simply the tail end of voice-generated signals that began in a preceding window.

If no reset condition is detected 540, the number of sampled signals in a profile is tested 550 to determine whether sufficient sampled signals have been accumulated to reliably exhibit the selected features. In particular, if the sum of level counters LOUD, LOW, and NO is less than a selected number 550, the next sampled signal is retrieved 520, and the PROFILE counters adjusted 530 and tested 540 as described above. Process 500 loops through steps 520, 530, 540, 550 until a complete sample window is accumulated 550. A complete sample window comprises between approximately 150 and 300 samples, which corresponds to sample windows of between 18 and 37 ms at a sampling rate of 8 KHz. In the preferred embodiment of method 500, a sample window comprises 200 samples.

When the sum of PROFILE counters equals the selected number of samples, features extracted from the PROFILE counters are compared 560 with the reference features obtained by sampling click events under comparable circumstances. For example, in the preferred embodiment of the invention, selected features of the PROFILE counters include a value of LOUD between approximately three and fifty, i.e. between three and fifty LOUD signals, the sum of LOW+LOWH (number of low signals from the current and preceding window) less than approximately 1.5-2 times LOUD, and LOWH less than approximately 25. If the PROFILE counters from the current window includes 550 these reference features, a 'click' event is deemed to have occurred. In one embodiment of the invention, detection of reference features 560 may be further corroborated by reference to a signal origin module (FIG. 6), which provides an independent gauge of the origin and type of audio signals being analyzed. If the features represented by the PROFILE counter do not match the reference features, the LOWH counter is updated 594 and a new sample window is initiated 510.

Referring again to FIG. 4, steps 468 and 470 of method 400 ensure that a potential click pulse is preceded by clean, non-voice-generated signals for a number of samples greater than or equal to the threshold value of WINDOW. This distinguishes click pulses from pulses at the tail end of voice-generated signals by requiring a delay of WINDOW samples between voice-generated signals and potential click pulses. Method 500 provides similar isolation between potential click pulses and voice-generated signals that originate in the preceding window and tail off in the current window. This is accomplished by saving the number of LOW signals from the preceding sample window in the LOWH counter. If the LOWH counter when combined with LOW from the current window indicates too much LOW signal activity across the current and preceding sample windows, a new window is initiated.

As in method 400, reset events 540 in method 500 include detection of too many LOUD and LOW level signals and passage of too much time between detected click pulses. In the preferred embodiment of method 400, the sampling rate is 8 KHz, and PROFILE is reset if more than 50 LOUD signals are detected within a sample window or the number of LOW signals in the present and preceding sample window (LOW+LOWH) is more than 1.7 times the number of LOUD signals. If a sample window completes without these reset conditions occurring, the PROFILE counters are checked for reference features including 3<LOUD<50, LOWH<25, and signal origin on remote line 128.

Completed sample windows having associated PROFILEs that include 560 the selected reference features are tentatively deemed 564 click events. A CLICK flag is checked to determine whether the preceding sample window also included a click event. When the current window is the second consecutive sample window containing a tagged profile and the INTERVAL counter, which measures the time between the first and second clicks, falls within the interval range expected for a sequence of click pulses 574, a second CLICKFLAG is set 580 to indicate the target sequence of windows has been detected. Alternatively, CLICKFLAG may be set 580 following a test 578 for a silence interval, as discussed below. In the preferred embodiment of method 500, the threshold value for INTERVAL is 0.25 s which corresponds to approximately 2000 samples at an 8 KHz sampling rate. Thus, the INTERVAL counter ensures that two clicks are detected within approximately 0.25 s of each other.

CLICKFLAG provides an indication to DSP 150 or system processor 170 that audio signals consistent with bridging activity clicks have been detected on remote line 128. In the preferred embodiment of the invention, this is followed by a check 578 for silence on remote line 128, consistent with the local party being put on hold while Central Office 110 completes the call between the remote party and the third party. If silence is detected, CLICKFLAG 580 is set. Otherwise, a new sampling window sequence is initiated 590, 594, 510.

As noted above, the signal origin module monitors audio signal on local and remote lines 126, 128, eliminates sidetones to further enhance isolation between these audio signals, and analyzes the isolated audio signal from remote line 128 to determine whether the signal levels are consistent with voice-generated audio signals, click generated audio signals or silence. Signal origin method 600 is less sensitive to bursts of audio signals which may be generated by echo canceling program 156. Consequently, it provides a valuable check on the analysis performed by program 156.

Signal origin method 600 takes into account energy coupled into remote line 128 from audio signals generated on local telephone 112, i.e. sidetone, and returns a non-zero value whenever voice type audio signals, are detected on remote line 128 following correction for sidetone. The non-zero value increments a counter Talk_Count. Talk_Count provides an alternative and highly reliable indicator of when audio signals on remote line 128 are attributable to voices, click events, or silence. As discussed below, Talk_Count can be used as a reference or reset feature method 500.

Referring now to FIG. 6, there is shown a flow chart representing signal origin method 600. At step 610, audio signals on local and remote lines 126, 128 are sampled, and the magnitude of these signals determined 620. Method 600 then adjusts 630 the signals for hysteresis. In the disclosed embodiment, this amounts to setting a loudness value of the current signal on remote line 128 equal to weighted values of the preceding and current signals. A similar determination is made for the loudness value of the current signal on local line 126. This adjustment makes the sampled signals less sensitive to artifacts created by the echo canceller program and retards the system response to short drops in the loudness of the audio signal.

The adjusted signal from remote line 128 is then compared 640 with a threshold level representing the lower loudness limit of audio signals (silence level) and with the selected fraction of the adjusted signal sampled from local line 126. The fraction is selected to reflect the coupling of signals on local line 126 to remote line 128 and comparing the adjusted loudness of the signal on remote line 128 to this coupled local audio signal indicates whether the signal can be accounted for by sidetones from local line 126. When the adjusted signal from remote line 128 exceeds 650 both the threshold level and the fraction of energy from local line 126, method 600 increments a voice activity counter (Talk_Count). Otherwise, a silence interval counter (Silence_Count) is incremented. Talk_Count provides a measure of the number of samples for which audio signals of any kind, i.e. voice or click generated audio signals, are detected on remote line 128, and Silence_Count performs the same function for signals that either fall below the minimum level expected for audio signals or are attributable to sidetones form local line 126.

Talk_Count typically gets to large values (>300) very quickly when someone is speaking on remote line 128. The clicks associated with bridging activity generate values of Talk_Count that are typically between about 5 and about 300. Values of Talk_Count less than 5, indicate that remote line 128 is silent. Consequently, if the statistical comparison method 500 indicates 564 a click event has occurred, checking Talk_Count for a value between 5 and 300 provides additional corroboration for the click event. Talk_Count is reset whenever it exceeds a threshold value indicative of talking or when a sample window is completed, and an appropriate signal may be provided for use as a reset or reference feature, respectively, in methods 400, 500.

Talk_Count provides a sensitive indication of the type of audio signals being sampled on remote line 128 and may be used in conjunction with the features of a profile to distinguish audio signals associated with three way call events from voice-generated audio signals. In particular, this counter is very sensitive to voice signals on remote line 128, the detection of which is inconsistent with the occurrence of three way calling. When voice signals originating from remote telephone 116 are transmitted on remote line 128, Talk_Count is incremented rapidly. In the preferred embodiment of the invention, method 500 will only deem a group of signals to be a click event if Talk_Count falls between 5 and approximately 300 during the corresponding sample window. A values of Talk_Count above 300 operates as a reset feature. A value of Talk_Count less than 5 indicates that the sampled signals did not originate on remote line 128.

Because of the different sampling approach used in method 400, Talk_Count is typically checked for a minimum activity level on remote line 128. In the preferred embodiment of method 400, Talk_Count is checked at step 470 to determine whether it exceeds 25, indicating that enough activity is present on remote line to be a click event.

Referring again to FIG. 6, method 600 increments a silence counter (Silence_Count) whenever the adjusted remote signal fails to meet 650 the threshold criteria for audio signals. Silence_Count is reset whenever voice-generated or click-generated audio signals are detected on remote line 128. In the preferred embodiment of method 500, Silence_Count is checked following detection of a pair of clicks within the requisite time intervals. If Silence_Count exceeds a threshold typical of the silence interval that follows bridging type activity, telephone system processor 170 is notified so appropriate action can be taken, i.e. disconnecting the call or recording the conversation.

Silence_Count may also be checked in method 400, following detection of a pair of tagged windows, to ensure that the events tentatively deemed "clicks" are followed by the requisite silent period. This is indicated by the dashed lines to step 447 in FIG. 4.

There has thus been disclosed a system and method for detecting three way call events by sampling audio signals, sorting the sampled signals into profiles, and analyzing the sample profiles for features characteristic of three way call-generated and voice-generated audio signals. Profiles accumulated during a sample window that include the former reference features and are free of the latter reset features are tagged as potential click events. A three way call attempt is declared when a target sequence of tagged profiles is detected.

What is claimed is:

1. A method for detecting three way call attempts on a telephone line comprising the steps of:

sampling audio signals on the telephone line at a selected sampling rate;

sorting the sampled audio signals according to a level associated with each sampled signal to produce a profile of sampled signals;

monitoring the profile for reset and reference conditions;

resetting the profile when a reset condition is detected; and tagging the profile as a potential click when no reset conditions are detected for a first preselected interval and a reference condition is detected.

2. The method of claim 1 comprising the additional steps of:

responsive to reaching the tagging step, repeating the sampling, sorting, and monitoring steps;

resetting the profile when a reset condition is detected; and setting a flag when the tagging step is reached for the second preselected interval.

3. The method of claim 2, wherein the flag indicates that a three way call attempt has occurred.

4. The method of claim 2, comprising the additional steps of:

responsive to setting the flag, sampling audio signals for an additional period to determine whether the telephone line is silent; and responsive to a determination that the telephone line is silent, generating an indication that a three way call attempt has occurred.

5. The method of claim 1, wherein the sorting step comprises the substeps of;

comparing the sampled signal level with a plurality of level ranges each of which has an associated level counter; and incrementing a level counter associated with the level range that includes the level of the sampled signal.

6. The method of claim 5, wherein the step of comparing sampled signal level with a plurality of level ranges comprises the substeps of:

comparing the sampled signal level with a high and low threshold level;

incrementing a high level counter when the signal level is at least as large as the high threshold; and incrementing a low level counter when the signal level falls between the high and low thresholds.

7. The method of claim 6, comprising the additional substeps prior to the comparing steps of:

identifying the sampled signal having the highest level in the current interval;

defining the high threshold level as a level at or above a fraction of the highest level; and defining the low threshold level as a level below the fraction of the highest level.

8. The method of claim 5, wherein the monitoring step comprises the substeps of:

comparing the level counters with associated reset and reference thresholds; and indicating a reset or reference condition exists when the level counters exceed a reset or reference threshold, respectively.

9. The method of claim 1, comprising the additional steps of:

adjusting signals sampled from the telephone line to correct for sidetones and hysteresis;

incrementing a first counter when the adjusted signal exceeds a reference threshold and incrementing a second counter otherwise; and providing an indication that the profile of sampled signals originate on the remote telephone line when the first counter exceeds a value characteristic of audio signals on the telephone line.

10. A system for detecting three way call attempts comprising:

a digital signal processor having a pair of inputs for receiving audio signals from remote and local signal sources; and a memory associated with the digital signal processor; and an audio signal analysis program stored in the memory for detecting indicia of three way call events among the audio signals, the signal analysis program comprising:

a sampling engine for generating a sorted profile of audio signal levels from the audio signals received by the digital signal processor; and a comparison engine coupled to the sampling engine for monitoring the profile of audio signals with reset and reference conditions, resetting the profile when a reset condition is detected, and providing an output indication of a three way call event when a reference condition is detected and no reset condition is detected during a first interval.

11. A system for detecting three way call attempts comprising:

a digital signal processor having a pair of inputs for receiving audio signals from remote and local signal sources;

a memory associated with the digital signal processor;

an audio signal analysis program stored in the memory for detecting indicia of three way call events among the audio signals, the signal analysis program comprising:

a sampling engine for generating a profile of audio signal levels from the audio signals received by the digital signal processor;

a comparison engine coupled to the sampling engine for monitoring the profile of audio signals with reset and reference conditions, resetting the profile when a reset condition is detected, and providing an output indication of a three way call event when a reference condition is detected and no reset condition is detected during a first interval; and a signal origin discrimination engine coupled to the digital signal processor and the sampling and comparison engines for adjusting the levels of sampled audio signals according to levels of audio signals detected on a local telephone line, comparing the adjusted signal levels with a reference threshold level to determine whether sampled signals originate on the telephone line, and providing an indication of the origin of the sampled signals to the comparison engine.

12. The system of claim 11, wherein the signal origin discrimination engine includes a counter which is incremented when adjusted signal levels fall below the reference threshold, for measuring sampled audio signals for silence intervals.

13. A computer readable storage medium on which data is stored for analyzing audio signals provided to a digital signal processor, the digital signal processor implementing the data to perform a process comprising the steps of:

sampling the audio signals from a telephone line;

sorting the sampled audio signals according to a a level associated with each sampled signal to produce a profile of sorted signals;

monitoring the profile of sampled signals for reference and reset conditions;

resetting the profile when a reset condition is detected; and tagging the profile as a potential click when no reset conditions are detected for a first preselected interval and a reference condition is detected.

14. A method for detecting three way call attempts on a telephone line, the method comprising the steps of;

initializing a sample counter and profile counters to track a number of times an audio signal is sampled and levels associated with the samples of the audio signal, respectively;

sampling the audio signal in a sample window;

sorting the sampled audio signals in the sample window according to a signal level associated with each sampled signal;

adjusting the profile counters according to the level associated with each sampled audio signal;

monitoring the adjusted profile counters for reset and reference conditions;

returning to the initializing step when a reset condition is detected;

returning to the sampling step when no reset condition is detected and the sample counter does not equal a reference value; and tagging the sample window as a potential three way call event when no reset condition is detected, a reference condition is detected, and the sample counter equals the reference value.

15. The method of claim 14, wherein the monitoring step comprises the substeps of:

comparing the profile counters with reset and reference values associated with each profile counter; and indicating a reset or reference condition when one of the profile counters exceeds a reset or reference value, respectively.

16. The method of claim 14 comprising the additional steps of:

returning to the initializing step when a sample window is tagged;

repeating the sampling, adjusting, and monitoring steps on a second sampling window; and providing an indication that a three way call attempt is occurring when the second sample window is tagged.

* * * * *

UNITED STATES PATENT AND TRADEMARK OFFICE
CERTIFICATE OF CORRECTION

PATENT NO.: 5,796,811

DATED: August 18, 1998

INVENTORS: John D. McFarlen

It is certified that an error appears in the above-identified patent and that said Letters Patent is hereby corrected as shown below:

Claim 13, line 6, replace "to a a level" with --to a level--.

Signed and Sealed this

Ninth Day of February, 1999

Attest:

*Attesting Officer*

*Acting Commissioner of Patents and Trademarks*